(12) United States Patent
Even

(10) Patent No.: US 7,243,414 B2
(45) Date of Patent: Jul. 17, 2007

(54) DEVICE FOR GRIPPING AND TRANSFERRING A RING OF ELECTRICAL CONDUCTORS WHICH IS USED TO PRODUCE A WINDING AND A WINDING-PRODUCTION SYSTEM EMPLOYING ONE SUCH DEVICE

(75) Inventor: Denis Even, Paris (FR)

(73) Assignee: Valeo Equipments Electriques Moteur, Creteil Cedex (FR)

( * ) Notice: Subject to any disclaimer, the term of this patent is extended or adjusted under 35 U.S.C. 154(b) by 0 days.

(21) Appl. No.: 10/518,680

(22) PCT Filed: Jun. 24, 2003

(86) PCT No.: PCT/FR03/01929

§ 371 (c)(1),
(2), (4) Date: Feb. 6, 2006

(87) PCT Pub. No.: WO04/001931

PCT Pub. Date: Dec. 31, 2003

(65) Prior Publication Data

US 2006/0230607 A1    Oct. 19, 2006

(30) Foreign Application Priority Data

Jun. 25, 2002 (FR) .................................. 02 07824

(51) Int. Cl.
*H02K 15/04* (2006.01)
*H02K 15/06* (2006.01)
(52) U.S. Cl. ............................ 29/732; 29/281; 29/596; 29/760
(58) Field of Classification Search .................. 29/596, 29/598, 732–736, 760, 251, 252, 253, 244, 29/281.1; 294/86.4, 87.1; 296/289 R, 900, 296/909
See application file for complete search history.

(56) References Cited

U.S. PATENT DOCUMENTS 2,476,745 A * 7/1949 Leece .......................... 72/427
5,522,125 A   6/1996 Bradtmueller et al.

FOREIGN PATENT DOCUMENTS

GB    1514609 A    6/1978
GB    2074055 A    10/1981
WO    WO92/06527 A1    4/1992

OTHER PUBLICATIONS

International Search Report dated Nov. 5, 2003, 3 pages.

* cited by examiner

*Primary Examiner*—Peter Vo
*Assistant Examiner*—Livius R. Cazan
(74) *Attorney, Agent, or Firm*—Osha Liang LLP

(57) ABSTRACT

The invention relates to a device for gripping and transferring a ring of electrical conductors in the form of pins which are used to produce a winding, such as a pin winding. The gripping device (C) is designed to seize the ring from a first element, such as a ring-forming element, and to transfer same into a second element (B), such as an element used to insert the ring into the member that supports the winding to be produced. The inventive device comprises a control cone (19) which can be moved axially inside a frame (13) for contact with levers (15) which are pivot mounted to the frame, such that the levers pivot when the cone is moved. The winding-production system is characterized in that it comprises an autonomous gripping and transfer device (C) which can be separated from the above-mentioned first and second elements (B) and which can be positioned on same in a pre-determined reference position. The invention can be used to produce a stator for an electrically-rotating machine.

12 Claims, 7 Drawing Sheets

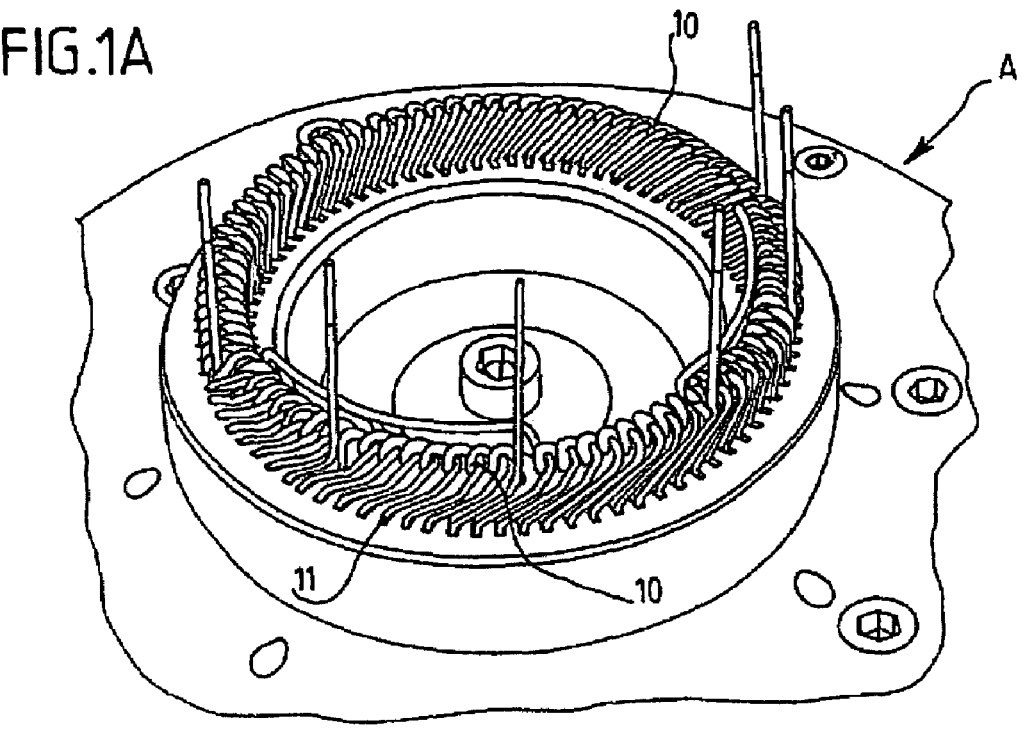
FIG. 1A
FIG. 1B
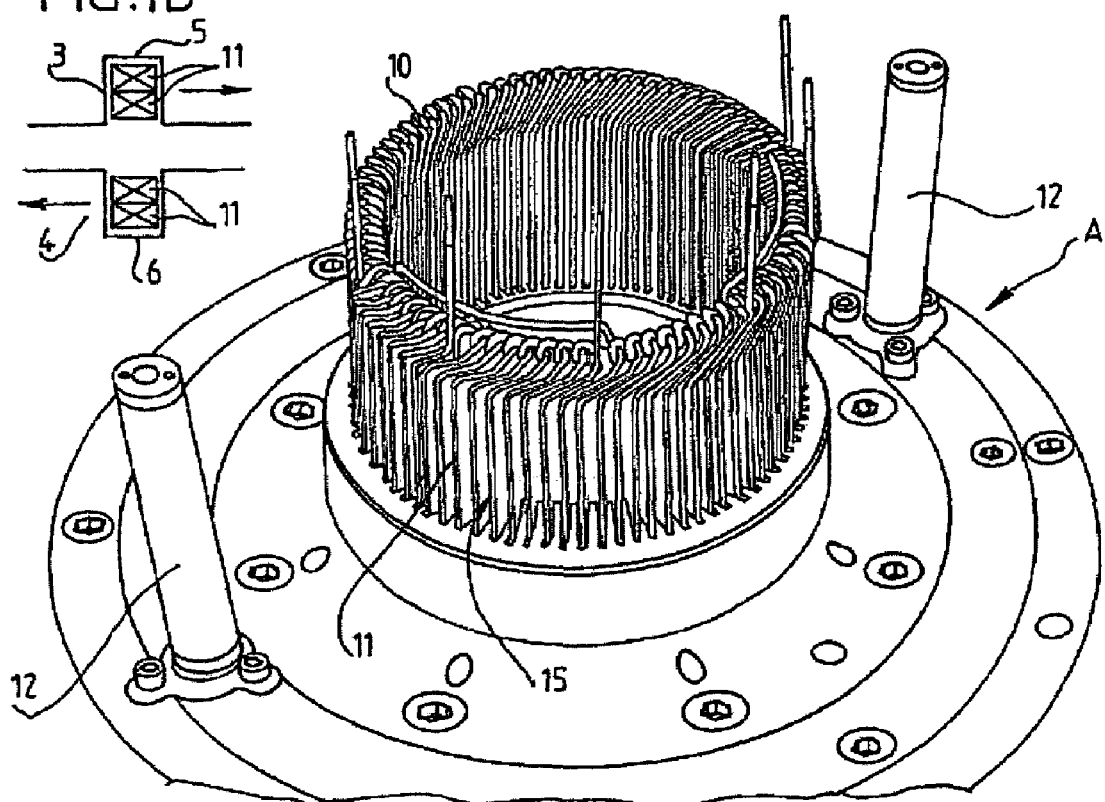
FIG. 2

DEVICE FOR GRIPPING AND TRANSFERRING A RING OF ELECTRICAL CONDUCTORS WHICH IS USED TO PRODUCE A WINDING AND A WINDING-PRODUCTION SYSTEM EMPLOYING ONE SUCH DEVICE

BACKGROUND OF INVENTION

1. Field of the Invention

The invention concerns a device for gripping and transferring a ring of electrical conductors in the form of pins, used to produce a winding, such as a pin winding, for the stator of a rotating electrical machine; the gripping device is adapted to seize the ring from a first device, such as a ring-forming element, and transfer it to a second element, such as an element to insert the ring in the element holding the winding to be produced.

The invention also concerns a system for producing a winding on a carrying element, such as the stator with a pin winding of a rotating electrical machine, that includes a ring support element which has axial notches in its internal radially cylindrical face and a winding formed by many electrical conductors, each in the form of a pin that has two prongs connected by a head which are mounted in series, the intermediate straight sections of which are placed in two notches that are angularly set off from each other by a predetermined angle, while the head parts generally in the form of a U and the ends of the prongs are wound as a result to obtain from one axial side of the support element a chignon formed by the heads of the pins and from the other side a chignon formed by the free combined ends of the pins; this system is the type that includes a first element to place the pin-shaped conductors in the form of a ring of conductors and to wind the heads of the pins, a device for gripping the ring of conductors with wound pin heads and for transferring this ring to a second device in which this ring is inserted in the winding support element.

2. Background Art

A system for producing a stator with a pin winding and a gripping device to remove and insert the pins, as defined above, is known through patent application WO 92/06527. The gripping device described in this document constitutes an independent transfer device that can be separated from said first and second devices. The disadvantage of this device lies in the fact that it acts on the heads of the pins.

To eliminate this disadvantage, one may consider using an arrangement of the type described in document GB-A-2 047 055 which uses a control device in the form of a case within which is mounted a cup. The case is mounted and movable in relation to the cup and acts on gripping levers. The cup has grooves to allow the passage of the levers, which are mounted with a joint on the cup, to move between a position for gripping the ring and an open position for releasing the ring.

The levers have two arms, one of which is a pivot control arm with a spherical control end installed in a circular groove of the frame and the other has ring-gripping elements at the end. The levers are mounted in such a way as to pivot on a ring element forming the frame, i.e. the cup, through their intermediate section located between the two arms.

Because of the presence of the case groove, there is a risk that the levers will jam.

SUMMARY OF INVENTION

The purpose of this invention is to correct this disadvantage.

According to the invention, the control elements include an element in the form of a cone coaxial to the frame which has an outside peripheral surface that is inclined in relation to the axis of the frame, which can be axially moved in the frame under the effect of a movement control device in the control cone and in that the ends of the control arms of the levers are maintained in support on the inclined surface so that the axial displacement of the cone causes the pivoting of the levers.

Using the cone according to the invention, the control devices are simplified and the risks of the levers sticking are reduced. In addition, the levers are simplified because the control arms have one end in local contact with the control cone, which is simple and economical to produce.

In addition, first, the displacement of the levers is more precise because of the cone, the slope of which depends on the applications and, second, the lever-gripping end is simplified because of the fact that the cone is coaxial in the frame.

In effect, the levers are longer because they are mounted to pivot through their intermediate section located between the two arms in a radial plane; the ring is maintained by the levers in a coaxial position in the frame.

In one form for producing it, the intermediate section is formed by the middle part of the levers According to one characteristic, for good pivoting of the levers, the intermediate section of the levers is mounted inside a cavity that is generally toroid in form that is part of the frame. This cavity is delimited by parts belonging to the frame. The parts present, for each lever, a slot for the passage of the lever arms.

These parts form a generally toroidal section that is hollow inside and they present an internal surface that is at least partially curved in a circle arc to allow the rotation of the intermediate sections of the levers which have spindles for this purpose Of course, the parts have slots for the passage of the lever arms.

According to another characteristic of the invention, for reliable displacement of all the levers, the ends of the control arms of the levers are maintained in support against the inclined surface of the lever pivot control cone through an elastic toroid joint arranged in a ring groove that is coaxial to the frame and the joint is formed by notches in the outside surface of the ends of the control arms.

According to another characteristic of the invention, to facilitate gripping the pins, at least some of the ends of the gripping arms of the levers have lateral pins to ensure clamping of the straight prongs of the pins on the ring of conductors of the winding to be formed against a support surface of the frame when the levers are in the clamping position.

According to another characteristic of the invention, the ends of the lever gripping arms are configured to penetrate between the straight prongs of the ring pins which are adjacent to the ring in the peripheral direction when the levers pivot in their gripping position.

According to another characteristic of the invention, the gripping and transfer device has handling grips.

According to another characteristic of the invention, which is simple and economical, the axial displacement control device of the cone is formed by a cylinder between the cone and the frame.

According to another characteristic of the invention, predetermined positioning elements on the aforementioned first and second devices are advantageously made in the form of tubular elements or small columns designed to work with additional small columns or tubular elements installed on said devices.

The system of the invention is characterized in that the gripping and transfer device is made in the form of an autonomous device that can be positioned on said first and second devices in a predetermined position and can be separated from these devices; the gripping and transfer device and said first and second devices include marking elements for a defined, predetermined positioning of the gripping and transfer device in relation to the first and second devices.

According to one characteristic of the system in the invention, the aforementioned first and second devices form independent and separate work stations.

According to another characteristic of the invention, the system includes a gripping and transfer device as defined above.

According to another characteristic of the invention, the aforementioned positioning mark elements are formed by at least two tubular elements or small columns which are installed respectively on the gripping and transfer device and, second, on the work stations, and is characterized in that the tubular elements are intended to be fit together on the small columns when the transfer device is placed on the work stations.

BRIEF DESCRIPTION OF DRAWINGS

The invention will be better understood, and other purposes, characteristics, details and advantages of the invention will appear more clearly in the following explanatory description by reference to the attached schematic drawings, given only as an example, illustrating a method for producing the invention, in which:

FIG. 1A is a view in perspective of a station to wind the pin heads of a ring of conductors in the form of pins that are to form a stator winding according to the invention, and shows the pin heads after the wind-up.

FIG. 1B is a stripped schematic view illustrating the arrangement of the pins in the wind-up station for the pin heads before the wind-up operation.

FIG. 2 is a perspective view of the wind-up station according to FIG. 1, but shows the ring in its position for gripping and withdrawal from this station.

DETAILED DESCRIPTION

Figure 3:
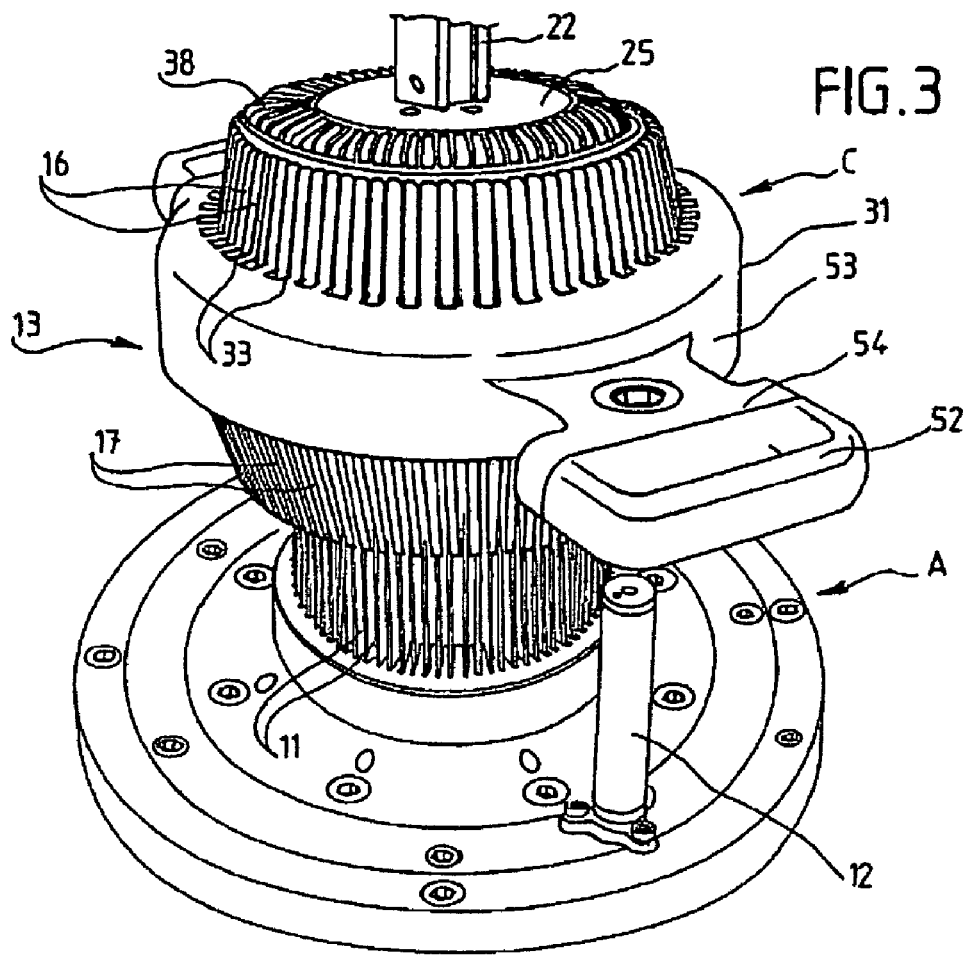
FIG. 3 is a perspective of the transfer device according to the invention, in its engaged position on the ring according to FIG. 2.

The invention will be described in its application to a system for producing a stator of a rotating electrical machine, such as an alternator for an automobile, which is equipped with a bearing annular element in the form of a stator body for mounting a winding formed by many conductors in the form of pins mounted in series. The pins contain two prongs connected by a curved head and are thus generally in the shape of a U. The pins cross with their prongs the body of the stator and form networks called chignons at the two ends of the body of the stator. One of the chignons is formed by the heads of the pins, and the other by the united (by welding, for example) free ends of the prongs of the pins connected to each other according to a specific configuration. The ring-shaped body of the stator is formed, by convention, by a packet of sheets equipped with axial notches for mounting the prongs of the pins.

The system according to the invention contains a first station A in which the heads of the pins with the overall structure of an annular ring are wound, as known, and a second station B in which the ring, after the first winding of the pin heads is inserted in the stator body and the free ends of the prongs of the pins are wound, as well as a device C to transfer and grip the pin ring after the first winding of the pin heads from the first station A to the second station B. For more details, refer, for example, to document WO 92/06527 describing the winding of the stator and its mounting in the body of the stator of an automobile alternator. The gripping device according to the invention is applicable to the winding of this document.

As shown in FIGS. 1A and 1b, the conductors in the form of a pin, designated by the general reference 1, are arranged in a device with two rotating coaxial tools 3 and 4, which have on the opposite surface notches 5 and 6, each intended to receive one of the two straight prongs 8 of two conductors in pin shape 1. After the insertion of the conductors in the notches of the stator body, the two tools turn in opposite directions, as illustrated by arrows, in a predetermined angle to obtain the desired winding of the heads 10 of the generally U-shaped pins Advantageously, station A is equipped with an upper plate (not shown), but known, for example, through document WO 92/06527 cited above, with protrusions for the formation of spacers for the upper ends of the pins. Station A also contains, which is also known, cams (not shown) which are used to push the pins axially to release a part of the right prongs indicated by reference 11 so that the winding can be seized by the transfer device C.

According to a characteristic of the invention, the fixed part of this station contains small positioning columns 12 on station A of the transfer device B which will be described below.

Figure 7:
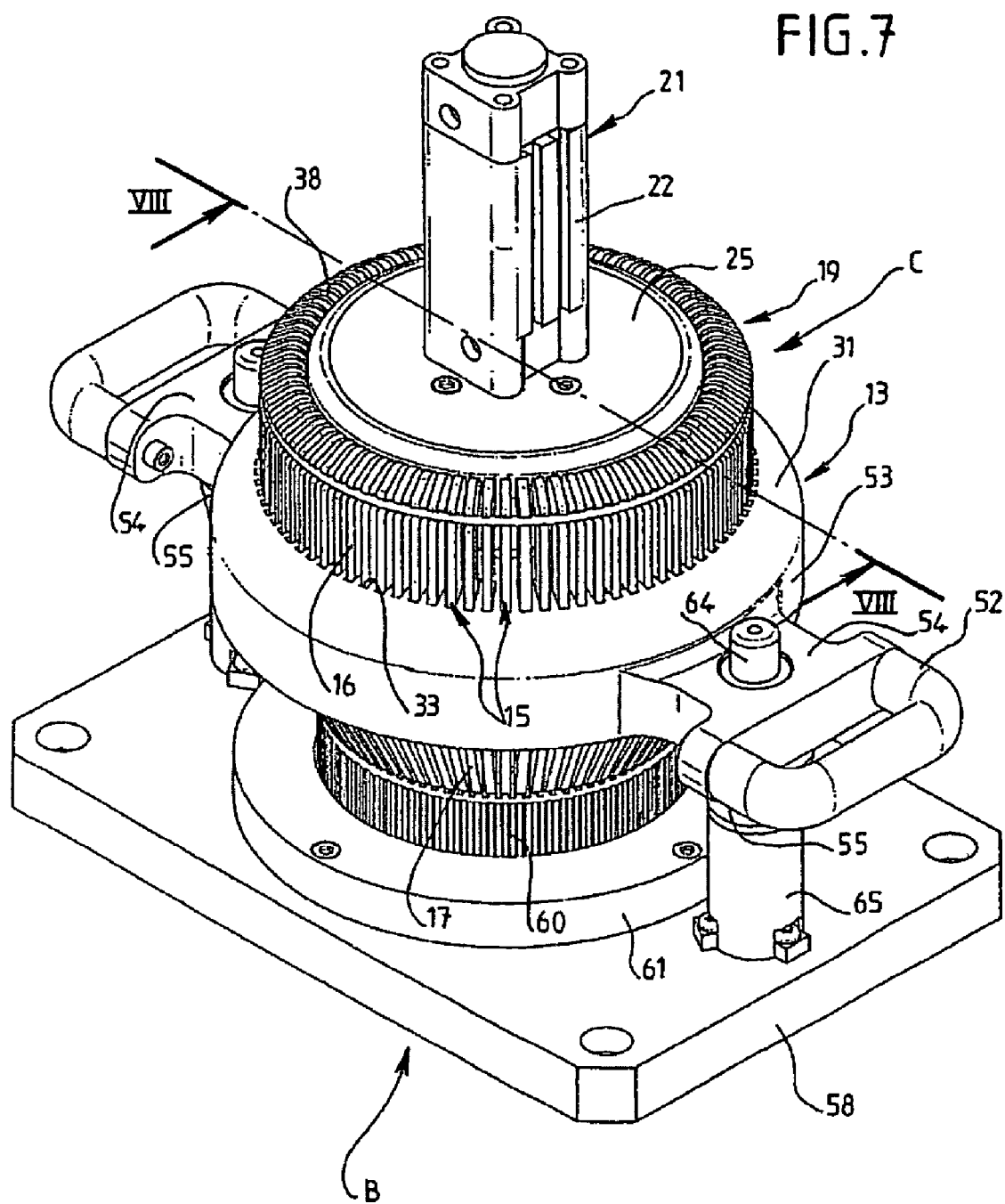
FIG. 7 is a perspective of the transfer device according to the invention and of the insertion station according to FIG. 6, during the insertion of the ring with wound pin heads.
Figure 8:
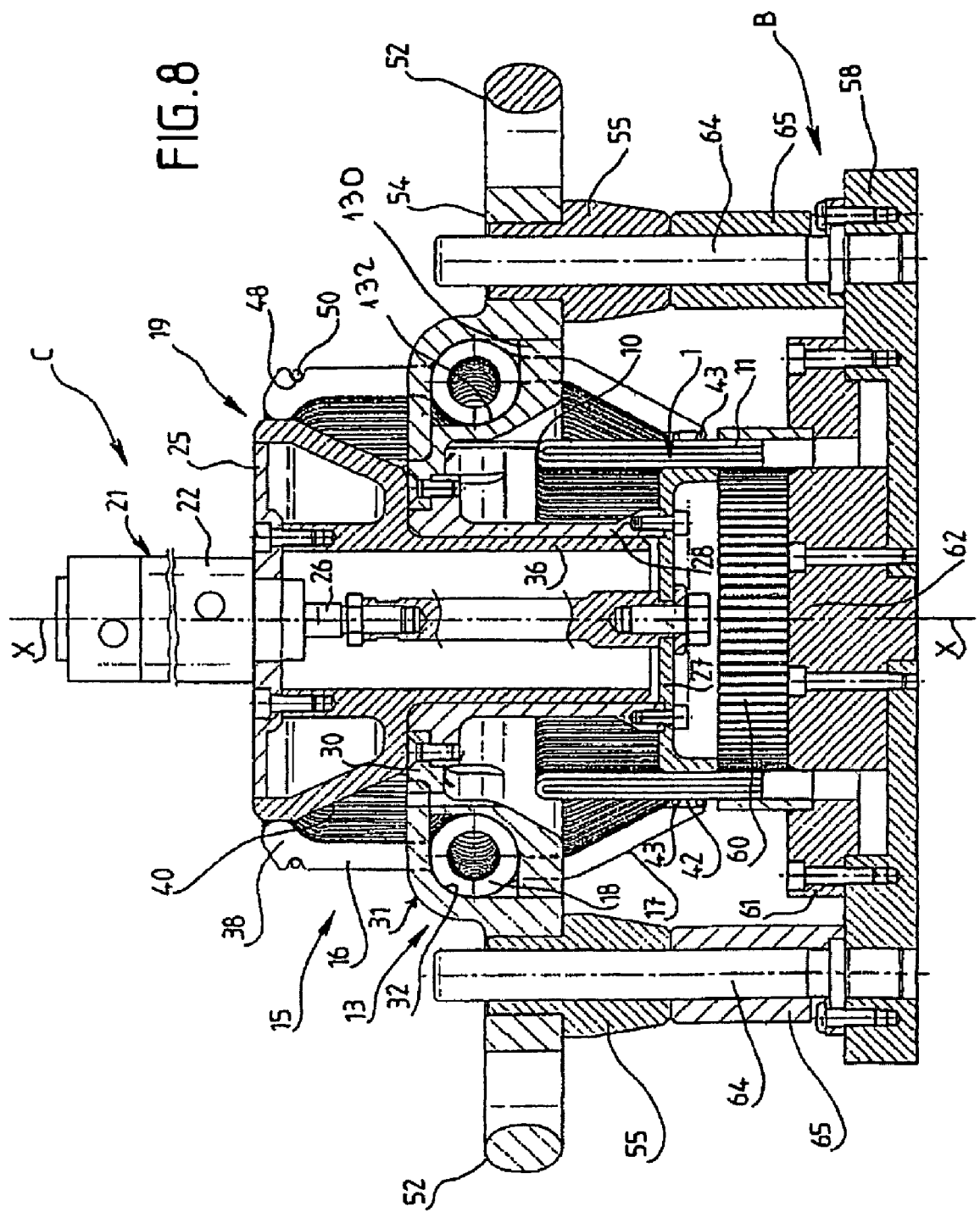
FIG. 8 is a section view according to line VIII-VIII of FIG. 7.
Figure 9:
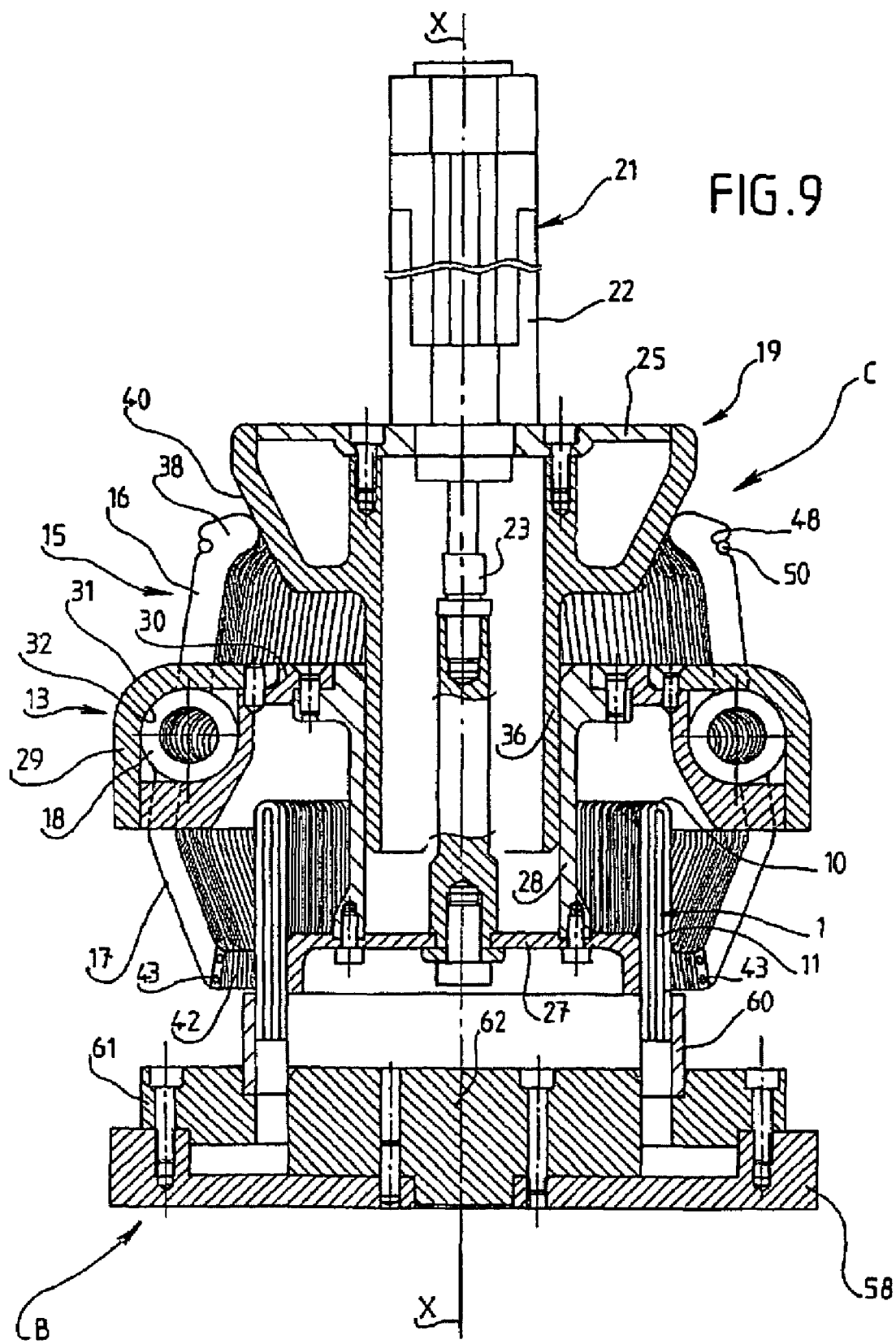
FIG. 9 is a section view similar to FIG. 8, but shows the transfer device after the release of the ring inserted in the stator body
Figure 10:
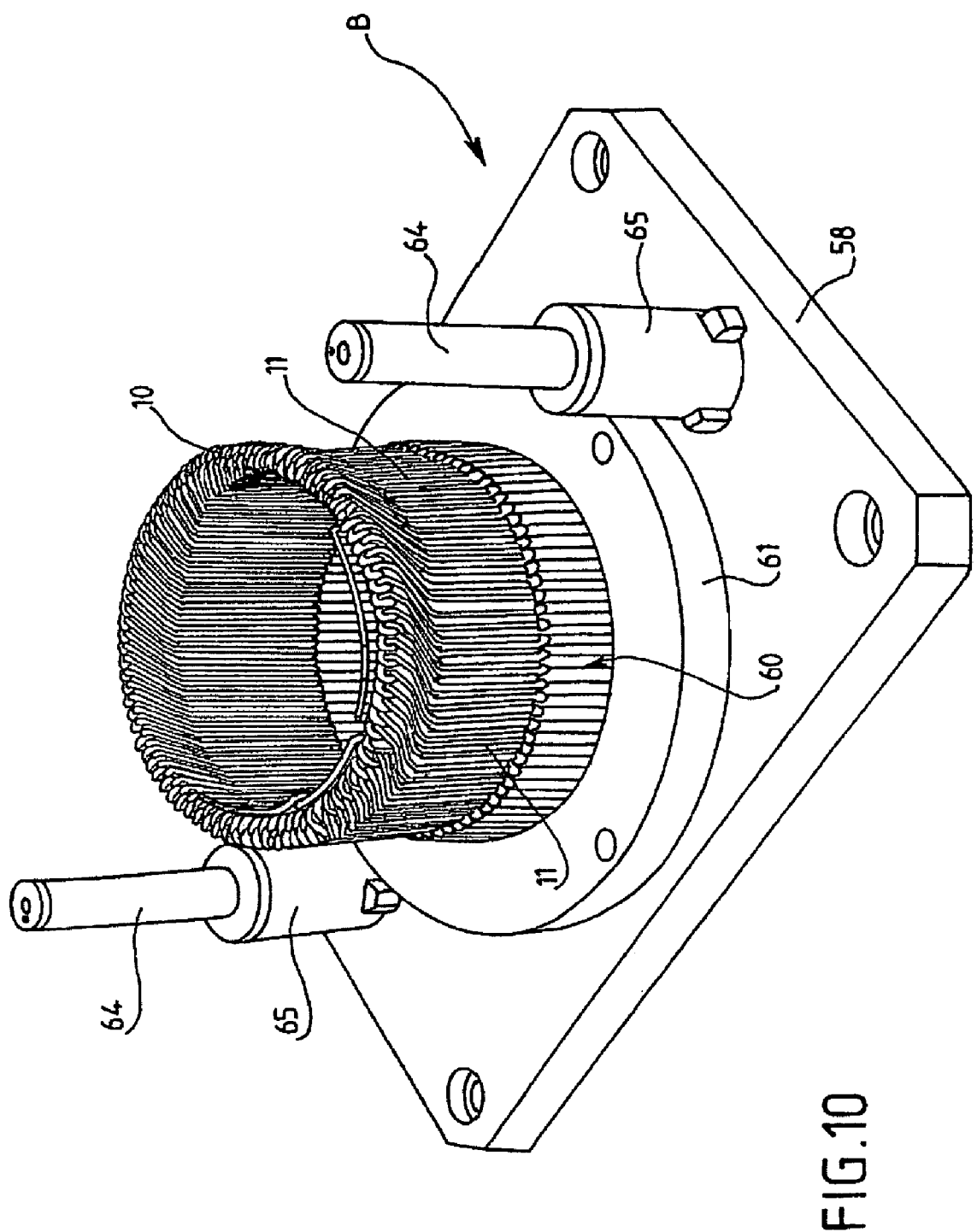
FIG. 10 is a perspective showing the ring, without the exits of the phases of FIG. 2, after its insertion in a stator body according to FIG. 9 and after the start of the transfer device.

Referring to FIGS. 7 to 9, the transfer and gripping device C essentially contains a fixed frame 13 to support a number of articulated blades 15, each in the form of a lever with two arms 16, 17, a control cone 19 for pivoting the levers 15, which is mounted axially and moves in the frame 13, and a control device to move the cone 19, made in the form of a valve 21 (hydraulic here), the cylinder of which 22 is mounted on an upper cover plate 25 of the cone 19, while the cylinder rod 26 is attached to a console 27 at the base of the frame 13. As a variant, the cylinder is electric. The levers 15 are mounted to pivot on the frame through their middle section 18 placed between the two arms. Here section 18 is a middle part; the arms 16, 17 are basically equal. In a variant, one of the arms is longer than the other. In the figures, the middle part 18 is in the form of a circular section so that it forms a cylindrical spindle, and is mounted to pivot in the frame 13. The levers 15 pivot through their middle section in a radial plane; the annular ring is maintained by the levers in a position coaxial to the frame.

This frame contains a central sleeve 28 with a circular transversal section, the lower end of which is joined (by screwing) to the console 27. Attached to the other end (here using a screw), through a part in the form of a coupling 30, is a hollow ring part 31 used to house the circular middle sections 18 of the levers 15. The internal face of part 31 is at least partially curved at 32 in a circle arc to allow the rotation of these middle parts 18. The coupling 30 is extended, here in a single piece, through a hollow annular part 130 that has an internal face that is also partially curved at 132 in a circle arc to allow the rotation of the middle section 18 of the levers 15.

The internal face of the hollow section 130 of the coupling 30 is axially and transversally offset from the internal face of part 31. Thus, part 31 delimits, with the hollow section 130 of the coupling 30, an annular cavity, here generally toroidal in form, to house the middle sections 18. Thus, an annular part 130, 31 is toroidal in form with an upper wall belonging to part 31 and a thicker, lower wall belonging to the hollow section 130 of the coupling 30. The upper and lower walls are parallel to each other and are oriented transversally in relation to the axial axis of symmetry X-X of the transfer and gripping device C. The X-X axis is also the axial axis of symmetry of the cylinder 19 and of the layout of the levers 15.

Here the upper wall of part 31 is connected through a wall in the form of a circle arc, with a curved surface on the inside 32, with an axially oriented cylindrical ring 29, while the lower wall of the section 130 is connected through a wall chamfered on the outside with a cylindrical ring 29 with an axial orientation for connection to the coupling 30. The ring 29 surrounds the ring of part 130, the exterior chamfered wall of which has the face 132 on the inside in the form of a circle arc. Part 31 and section 130 are thus mounted in the opposite way.

The toroidal core 31, 130 contains, for each lever 15, a slot 33 in its upper and lower walls for the passage of the arms 16 and 17 of the levers. Each slot 33 has a width slightly greater than the width of the corresponding lever and is long enough to allow the lever to pivot.

The pivot control cone 19 for the levers 15 has, at the end opposite the end capped by the plate 25, a coaxial end with a circular transversal section 36, which is mounted axially and slides in the sleeve 28 of the frame 13, under the action of the actuating cylinder 21.

The transfer device C has a number of pivoting levers 15; this number is equal to the number of pin-shaped conductors 1 of the rotor winding to be produced. As can be seen on FIGS. 8 and 9, the ends 38 of the upper control arms 16 of the levers 15 are curved in the direction of the X-X axis of the transfer device and are support by their rounded end surface on the peripheral conical surface 40 of the control cone 19. The cone shrinks from top to bottom. The free tab-shaped end 42 of each lower gripping arm 17 of a pivoting lever 15 is bent in the direction of the X-X axis. The bent ends extend perpendicularly to the X-X axis, with a width that allows them to penetrate between the straight prongs 11 of two adjacent pin conductors 1.

Figure 5:
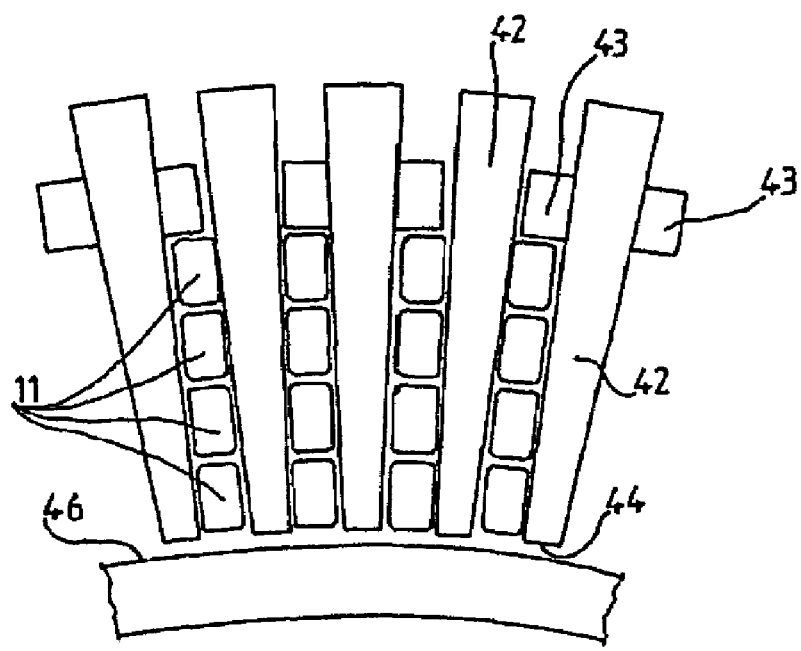
FIG. 5 is a schematic view showing the operation for gripping the ring by the transfer device.
Figure 6:
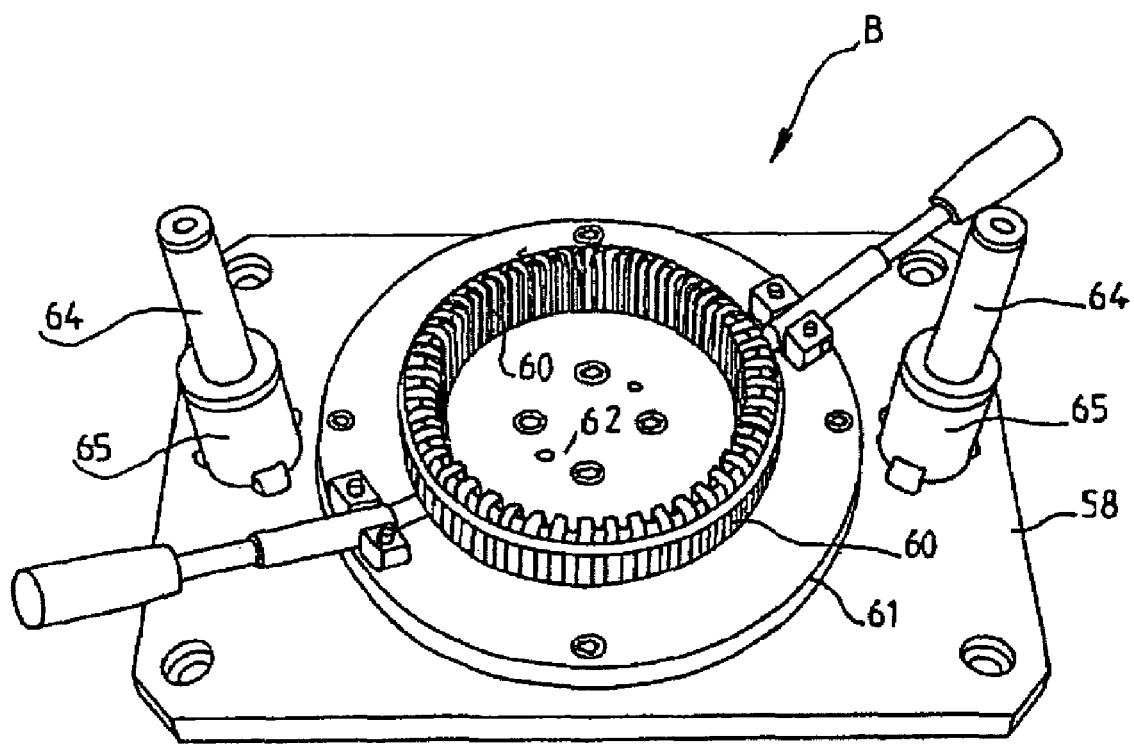
FIG. 6 is a perspective of the station that inserts the ring with wound pin heads, according to the invention, in a stator body.

As FIG. 5 shows, one out of two of the ends 42 is configured in a gripping tab by associating pins 43 with it that extend laterally on either side. These pins are located at a distance from the free end edge 44 of the tab to ensure a gripping effect by clamping the four straight radially aligned pins 11 of the winding located between two adjacent ends 42, between a pin 43 and a support surface 46 of the frame of the transfer device, which is formed by the cylindrical outside peripheral surface, with an axial orientation, of the console 27 made for this purpose in the form of an upside down cup. The pins 43 are located at the junction between the tab 42 that carries them and the rest of the lever arm 17.

As shown on FIGS. 8 and 9, to ensure proper operation of the levers, the centers of the circular central sections 18 of the levers are on a circle coaxial to the X-X axis of the device, the diameter of which is greater than the outside diameter of the ring formed by the straight prongs 11 of the pins 1.

According to an important characteristic of the invention, each lever 15 has, at its upper support end 38 on the surface 40 of the cone 19, on the outside surface, a notch 48 so that all the notches 48 form an annular groove in which is placed an elastically stretchable seal 50, the function of which is to maintain the support ends 38 on the conical surface 40 of the control cone 19. As a result, when the cylinder 21 moves the control cone 19 from its upper position to the bottom, the levers 15 pivot between a maximal spread position of the tabs 42 of the X-X axis and a closed position for gripping the winding ring to be transferred from station A to station B According to another important characteristic of the invention, the transfer device C contains, arranged opposite each other around the diameter, two handling grips 52 which are each attached to the outside peripheral surface 53 of the ring 29 of part 31 of the frame 13 by an intermediate part 54 which carries a tubular part 55 with an axis parallel to the X-X axis of the device. The two tubular parts 55 are arranged so that they can engage on the small columns 13 of the winding station A and ensure, working with these small columns, a precisely defined positioning for the transfer device on the winding ring as produced in station A.

Station B contains, as shown on FIGS. 6 to 10, a support base 58 for an annular stator body as designated by reference 60 on FIGS. 8 and 9. To ensure a centered position for the stator body on the base, the base has an outside centering washer 61 and an interior centering part 62. The body of the stator is then arranged between the washer and the central part 62, as shown on FIGS. 8 and 9. The washer 61 and the part 62 are screwed here onto the base 58.

The base 58 of station B has, on its upper surface, two small columns 64 for positioning the transfer device C, which are arranged so that they each engage a centering element 55 of this device. The small columns are surrounded by exchangeable, tubular support elements 65 for the front surfaces of the centering elements 55. All this is made possible by the cone 40 and the annular part 31.

It should also be noted that station B is also equipped with four concentric tools (not shown) for winding the straight pins 11 of the winding ring after the insertion in the grooves of the body of the stator and driving in the pins. Since this second winding operation and the tools used for this purpose are known, the tools will not be described in more detail.

We will describe below the operation of the stator-producing system that has just been described.

In the first winding station A, after the insertion of the pin-shaped conductors 1 into the notches 5, 6 of the two rotating tools 3 and 4, which then form a ring of pins, the tools are turned in the opposite direction to perform the winding of the pin heads. Then, through the action of ejection rods, the pins on which the prongs are still straight are pushed again until there is only a small part engaged in the winding tools.

Then, the transfer station C is moved to winding station A and is positioned on this station by passing the centering tubes 55 onto the positioning small columns 12 of station A. The levers 15 of the device C are then in their position away from the X-X axis, and the support cone 19 is in its high position.

After the correct positioning of device C on station A, the cylinder 21 is activated so that it moves the support cone 19 toward the bottom, which pivots the levers 15 into their position for gripping the winding ring still retained in station A. This pivoting forces the tabs 42 of the arms of lever 17 to penetrate between the straight prongs of the pin conductors until one out of two of the rows of four prongs are encircled between the pins 43 and the support surface 46 of the console 27 of the transfer station frame (FIG. 5). Then the transfer station C is moved vertically upward along the positioning small columns 12 and removes the winding ring from station A, then the prongs of the pins remain trapped in the transfer device.

Figure 4:
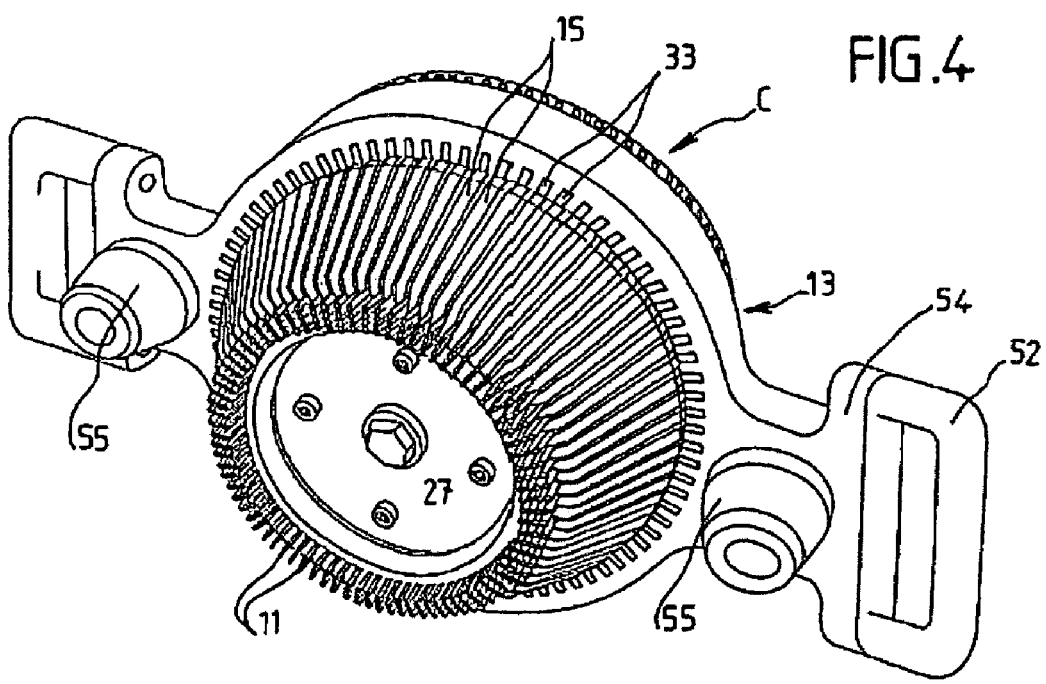
FIG. 4 is a perspectives of the transfer device after gripping and removal of the ring from the wind-up station.

Then the transfer device C is moved with the winding ring trapped, as shown in FIG. 4, to the second station B, and this device is positioned on the station by threading the centering tubes 55 onto the positioning small columns 64 of this device. During this threading, which ensure the correct relative position of the transfer device C and of the winding ring in relation to the stator 60, which was previously placed in station B, the ends of the straight prongs of the pins penetrate the notches of the stator body, as shown in FIG. 8. Then, the gripping tabs 42 of the levers 15 are spread out, which release the ring held by the ends of the pins in the stator body by displacement of the support cone 19 upward using the cylinder 21. In this open lever position, the transfer device C can be removed from station B.

Then, after driving the pins 1 into the body of the stator 60, the ends of the pin prongs 11 are wound with the four concentric tools that are part of station B, as is known in the industry.

It should be noted that, thanks to the positioning of small columns 12 and 64 of stations A and B and the centering tubes 55 which can be threaded onto these small columns, of the transfer device C, stations A and B can be independent and separated from each other and the pin ring, after the first winding at station A, can be carried by the transfer device C to station B, without risk of the loss of the correct positioning marks on the ring in relation to the body of the stator.

The invention can be used for the production of triphased windings or windings with two offset triphased systems, or with any number of offset triphased systems. The pin windings can have 2, 4, 6 or even more conductors per notch. The windings are particularly used advantageously for automobile alternators, particularly with 6, 7, 8 or 9 pairs of poles such as those described in application FR-A-2 819 117. This is why we see in FIGS. 1A and 2 the winding phase outputs and the neutral bars. With the invention, the presence of such neutral bars with a circumferential orientation and outputs with an axial orientation is possible; these outputs extend axially in relation to the heads. For more details, refer to this document. Of course, the invention is applicable to an automobile starter; in this case, the winding is the winding of a rotor that constitutes the bearing element.

What is claimed is:

1. A device for gripping and transferring a ring of electrical conductors in the form of pins used to produce a pin winding for a rotating electrical machine stator, the gripping device comprising:
    a support element comprising
        a frame having an axis, and
        a plurality of levers for gripping the ring,
    wherein each of the plurality of levers comprises
        a control arm,
        a gripping arm having an end element configured to grip the ring, and
        an intermediate section between the control arm and the gripping arm;
            wherein the intermediate sections of the plurality of levers are pivotally mounted on the frame, the pivotal mounting comprising a position for gripping the ring and a release position;
    at least one control element configured to pivot the plurality of levers, the at least one control element comprising
        a cone disposed coaxial to the frame, and having a surface inclined relative to the axis of the frame,
    wherein the at least one control element is configured to axially move the cone in the frame;
    wherein the ends of the control arms of the plurality of levers are maintained in support against the inclined surface of the cone;
    wherein the plurality of levers pivot in response to the axial movement of the cone; and wherein the gripping device is adapted to
        seize the ring in a first device for forming the ring, and
        transfer the ring to a second device by inserting the ring in the support element of the winding.

2. The device according to claim 1,
    wherein the ends of the control arms of the plurality of levers are maintained in support against the inclined surface by an elastically stretchable seal, and
    wherein the elastically stretchable seal is stretched and disposed in an annular groove coaxial to the frame, the coaxial groove being formed by notches on an outside surface of the ends of the control arms.

3. The device according to claim 1,
    wherein the pivoting of the plurality of levers is in a radial plane, and
    wherein the ring is maintained by the plurality of levers in a position coaxial to the frame.

4. The device according to claim 1, wherein the intermediate sections are formed by middle sections of the plurality of levers.

5. The device according to claim 1,
    wherein the intermediate sections of the plurality of levers is mounted inside a cavity having a generally toroidal form, and
    wherein the cavity is delimited by annular parts of the frame, the annular parts having a slot for passage of each of the control arms and the gripping arms of the plurality of levers.

6. The device according to claim 5,
    wherein the annular parts form a generally toroidal section, the generally toroidal section having a hollow inside, and
    wherein an internal surface of the hollow inside is at least partially curved along a circle arc such that rotation of the intermediate sections of the plurality of levers having spindles is allowed.

7. The device according to claim 1,
wherein at least some of the end elements of the gripping arms of the plurality of levers have lateral pins, and
wherein the lateral pins are configured to tighten straight prongs of the pins of the ring of electrical conductors of the winding to be formed against a support surface of the frame when the plurality of levers are in a tightening position.

8. The device according to claim 7, wherein the end elements of the gripping arms of the plurality of levers are configured to penetrate between the straight prongs of the pins of the ring disposed adjacent to a peripheral of the ring when the plurality of levers are in the gripping position.

9. The device according to claim 1, further comprising handling grips.

10. The device according to claim 1, wherein the control device comprises a cylinder placed between the cone and the frame.

11. The device according to claim 1, further comprising predetermined positioning elements on the first and second devices, wherein the predetermined positioning elements are tubular elements configured to work with small columns.

12. The device according to claim 1, further comprising predetermined positioning elements on the first and second devices,
wherein the predetermined positioning elements are small columns configured to work with tubular elements.

* * * * *

UNITED STATES PATENT AND TRADEMARK OFFICE
CERTIFICATE OF CORRECTION

PATENT NO. : 7,243,414 B2 Page 1 of 1
APPLICATION NO. : 10/518680
DATED : July 17, 2007
INVENTOR(S) : Denis Even It is certified that error appears in the above-identified patent and that said Letters Patent is hereby corrected as shown below:

On the Title Page:

Item (73) Assignee, "Valeo Equipments Electriques Moteur" should be --Valeo Equipements Electriques Moteur--.

Signed and Sealed this

Twenty-seventh Day of November, 2007

JON W. DUDAS
*Director of the United States Patent and Trademark Office*